(12) United States Patent
Fujii et al.

(10) Patent No.: US 12,270,183 B2
(45) Date of Patent: Apr. 8, 2025

(54) METHOD OF ESTIMATING MOMENT OF WORK IMPLEMENT

(71) Applicant: KOMATSU LTD., Tokyo (JP)

(72) Inventors: Kensuke Fujii, Tokyo (JP); Toshiaki Kumagai, Tokyo (JP); Motoki Koyama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 200 days.

(21) Appl. No.: 18/008,261

(22) PCT Filed: Jan. 24, 2022

(86) PCT No.: PCT/JP2022/002401
§ 371 (c)(1),
(2) Date: Dec. 5, 2022

(87) PCT Pub. No.: WO2022/176515
PCT Pub. Date: Aug. 25, 2022

(65) Prior Publication Data
US 2023/0212839 A1    Jul. 6, 2023

(30) Foreign Application Priority Data
Feb. 22, 2021  (JP) ................... 2021-026407

(51) Int. Cl.
*E02F 9/26* (2006.01)
*E02F 3/43* (2006.01)
(Continued)

(52) U.S. Cl.
CPC .............. *E02F 9/26* (2013.01); *G01G 19/08* (2013.01); *E02F 3/431* (2013.01); *E02F 9/2203* (2013.01)

(58) Field of Classification Search
CPC . E02F 9/26; E02F 3/431; E02F 9/2203; E02F 3/435; E02F 9/264; E02F 9/20; G01G 19/08; B60Y 2200/412
See application file for complete search history.

(56) References Cited

U.S. PATENT DOCUMENTS 3,583,585 A * 6/1971 Joyce ..................... E02F 3/42
414/694
5,002,454 A * 3/1991 Hadank ................ E02F 9/2025
74/471 XY
(Continued)

FOREIGN PATENT DOCUMENTS

JP   S60-102436 A   6/1985
JP   H07-252091 A   10/1995
(Continued)

*Primary Examiner* — Mussa A Shaawat
(74) *Attorney, Agent, or Firm* — Faegre Drinker Biddle & Reath LLP

(57) ABSTRACT

A first payload computation value which represents a weight of loads loaded on the work implement in a first attitude is obtained. The first attitude and a second attitude are equal to each other in ratio between a horizontal distance from a position of a center of gravity of a first link member to a base end of the first link member and a horizontal distance from a position of the center of gravity of the loads loaded on the work implement to the base end. A second payload computation value which represents a weight of loads loaded on the work implement in the second attitude is obtained. When the first payload computation value and the second payload computation value are determined as being different from each other, a weight of a second link member is changed and processing above is repeated.

13 Claims, 7 Drawing Sheets

(51) Int. Cl.
*E02F 9/22* (2006.01)
*G01G 19/08* (2006.01)

(56) References Cited

U.S. PATENT DOCUMENTS

| | | | | |
|---|---|---|---|---|
| 5,178,510 | A * | 1/1993 | Hanamoto | E02F 3/438 |
| | | | | 37/348 |
| 5,383,390 | A * | 1/1995 | Lukich | E02F 9/2221 |
| | | | | 60/426 |
| 5,446,980 | A * | 9/1995 | Rocke | E02F 3/439 |
| | | | | 701/50 |
| 6,246,923 | B1 * | 6/2001 | Sugimura | G05B 19/416 |
| | | | | 414/217 |
| 2014/0084831 | A1 * | 3/2014 | Kawaguchi | E02F 9/2292 |
| | | | | 318/434 |
| 2014/0121840 | A1 * | 5/2014 | Mizuochi | G06F 30/15 |
| | | | | 700/275 |
| 2020/0095751 | A1 * | 3/2020 | Nishimura | E02F 9/264 |
| 2022/0178106 | A1 * | 6/2022 | Kumagai | E02F 9/264 |

FOREIGN PATENT DOCUMENTS

| | | | |
|---|---|---|---|
| JP | 2003-073078 | A | 3/2003 |
| JP | 2019-065655 | A | 4/2019 |
| JP | 2020-158961 | A | 10/2020 |
| JP | 2020-165253 | A | 10/2020 |
| JP | 2020-165256 | A | 10/2020 |
| KR | 10-2020-0003037 | A | 1/2020 |

* cited by examiner

METHOD OF ESTIMATING MOMENT OF WORK IMPLEMENT

TECHNICAL FIELD

The present disclosure relates to a method of estimating a moment of a work implement in a work vehicle.

BACKGROUND ART

A weight of loads loaded on a work implement is important for knowing a workload of a work machine. Japanese Patent Laying-Open No. 60-102436 (PTL 1) discloses a technique for computing a weight of loads based on a moment balance equation with a boom pivot fulcrum being defined as a center.

CITATION LIST

Patent Literature

PTL 1: Japanese Patent Laying-Open No. 60-102436

SUMMARY OF INVENTION

Technical Problem

When designed values of a weight and a position of a center of gravity of each link member included in a work implement are unknown, actual measurement thereof is also difficult. Therefore, accuracy in computation of a load weight cannot be enhanced.

The present disclosure proposes a technique for more accurately computing a load weight.

Solution to Problem

According to the present disclosure, a method of estimating a moment of a work implement in a work machine is proposed. The work machine includes a vehicular body and a work implement movable relatively to the vehicular body. The work implement includes a first link member supported on the vehicular body by a pivot fulcrum shaft and a second link member attached to a tip end of the first link member. The moment of the work implement means the moment of the work implement with the pivot fulcrum shaft being defined as a balance center. The method includes steps below. A first step is a step of setting the work implement to a first attitude. A second step is a step of obtaining a first payload computation value which represents a weight of loads loaded on the work implement in the first attitude. A third step is a step of setting the work implement to a second attitude. The first attitude is equal to the second attitude in ratio between a horizontal distance from a position of a center of gravity of the first link member to a base end of the first link member and the horizontal distance from a position of a center of gravity of the loads loaded on the work implement to the base end. A fourth step is a step of obtaining a second payload computation value which represents a weight of the loads loaded on the work implement in the second attitude. A fifth step is a step of comparing the first payload computation value and the second payload computation value with each other. The method further includes a step of repeating processing from the first step to the fifth step with a weight of the second link member being changed when the first payload computation value and the second payload computation value are determined as being different from each other as a result of comparison between the first payload computation value and the second payload computation value.

Advantageous Effects of Invention

According to the method in the present disclosure, an accurate value of a load weight can be calculated by accurately estimating a moment of the work implement.

DESCRIPTION OF EMBODIMENTS

Figure 1:
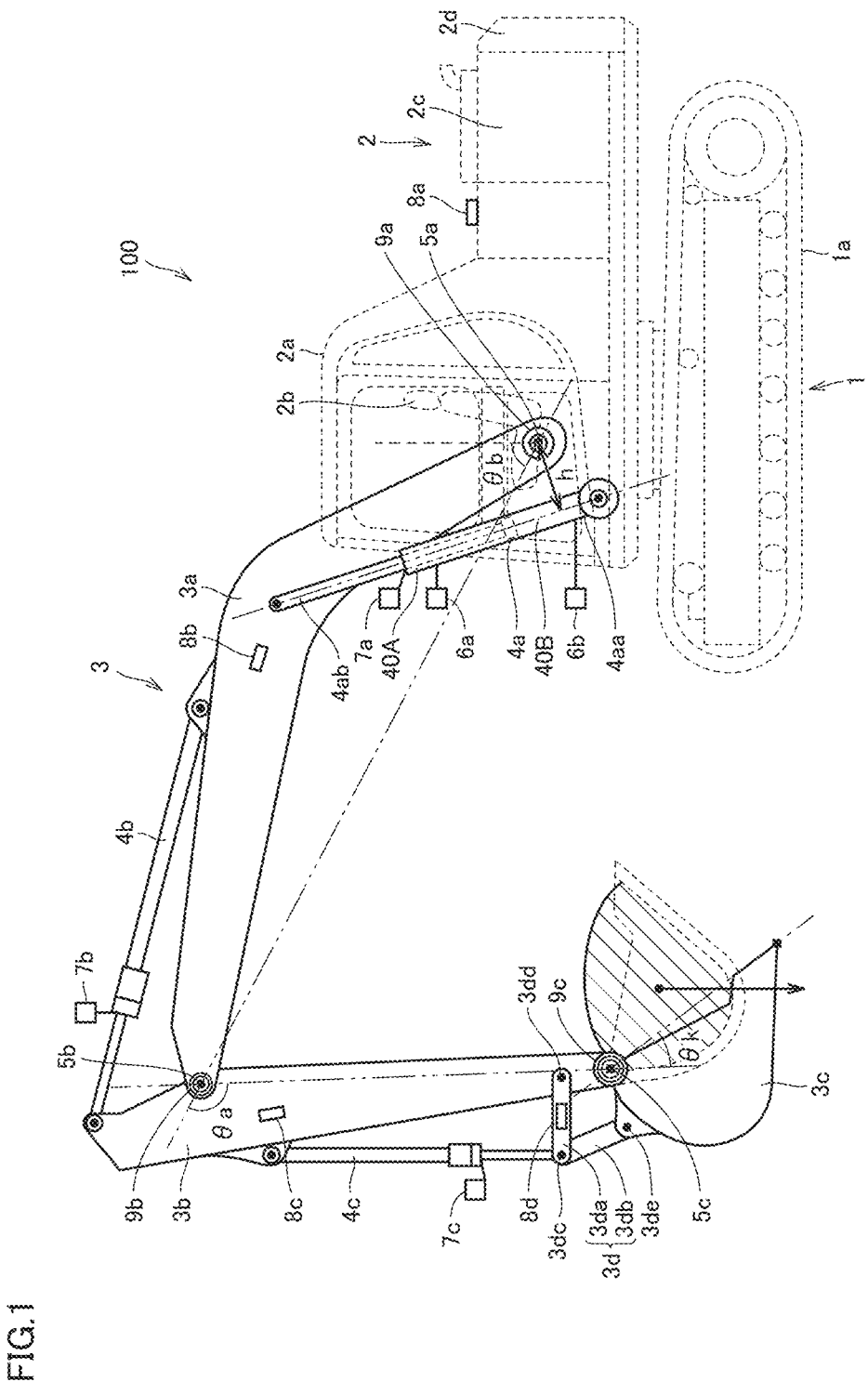
FIG. 1 is a diagram schematically showing a construction of a work machine based on an embodiment of the present disclosure.

An embodiment will be described below with reference to the drawings. In the description below, the same components have the same reference characters allotted and their labels and functions are also identical. Therefore, detailed description thereof will not be repeated.

The present disclosure is applicable to a work machine other than a hydraulic excavator so long as the work machine includes a work implement and the work implement includes a plurality of link members. In the description below, "up", "down", "front", "rear", "left", and "right" refer to directions with an operator seated in an operator's seat $2b$ within an operator's cab $2a$ being defined as the reference.

<Construction of Work Machine>

FIG. 1 is a side view schematically showing a construction of a hydraulic excavator 100 as an exemplary work machine based on an embodiment of the present disclosure. As shown in FIG. 1, hydraulic excavator 100 in the present embodiment mainly includes a traveling unit 1, a revolving unit 2, and a work implement 3. A vehicular body of the work machine is constituted of traveling unit 1 and revolving unit 2.

Traveling unit 1 includes a pair of left and right crawler belt apparatuses $1a$. Each of the pair of left and right crawler belt apparatuses $1a$ includes a crawler belt. As a pair of left and right crawler belts is rotationally driven, hydraulic excavator 100 travels.

Revolving unit 2 is provided as being revolvable with respect to traveling unit 1. Revolving unit 2 mainly includes operator's cab (cab) $2a$, operator's seat $2b$, an engine compartment $2c$, and a counterweight $2d$. Operator's cab $2a$ is arranged, for example, on the forward left (on a front side of a vehicle) of revolving unit 2. Operator's seat $2b$ where the operator takes a seat is arranged in an internal space in operator's cab $2a$.

Each of engine compartment 2c and counterweight 2d is arranged in a rear portion (on a rear side of the vehicle) of revolving unit 2 with respect to operator's cab 2a. An engine unit (an engine and an exhaust treatment structure) is accommodated in engine compartment 2c. An engine hood covers the top of engine compartment 2c. Counterweight 2d is arranged in the rear of engine compartment 2c.

Work implement 3 is pivotably supported on the front side of revolving unit 2, and for example, on the right of operator's cab 2a. Work implement 3 includes, for example, a boom 3a, an arm 3b, a bucket 3c, a boom cylinder 4a, an arm cylinder 4b, and a bucket cylinder 4c. Boom 3a has a base end rotatably coupled to revolving unit 2 with a boom foot pin 5a being interposed. Boom foot pin 5a is a pivot fulcrum shaft of boom 3a. Arm 3b has a base end rotatably coupled to a tip end of boom 3a with an arm coupling 5b being interposed. Bucket 3c is rotatably coupled to a tip end of arm 3b with an attachment coupling pin 5c being interposed.

Boom 3a can be driven by boom cylinder 4a. As a result of this drive, boom 3a can pivot around boom foot pin 5a in an upward/downward direction with respect to revolving unit 2. Arm 3b can be driven by arm cylinder 4b. As a result of this drive, arm 3b can pivot around arm coupling pin 5b in the upward/downward direction with respect to boom 3a. Bucket 3c can be driven by bucket cylinder 4c. As a result of this drive, bucket 3c can pivot around attachment coupling pin 5c in the upward/downward direction with respect to arm 3b. Work implement 3 can thus be driven.

Work implement 3 includes a bucket link 3d. Bucket link 3d includes a first member 3da and a second member 3db. A tip end of first member 3da and a tip end of second member 3db are coupled to each other as being rotatable relative to each other with a bucket cylinder top pin 3dc being interposed. Bucket cylinder top pin 3dc is coupled to the tip end of bucket cylinder 4c. Therefore, first member 3da and second member 3db are coupled to bucket cylinder 4c with the pin being interposed.

First member 3da has a base end rotatably coupled to arm 3b with a first link pin 3dd being interposed. Second member 3db has a base end rotatably coupled to a bracket at a root of bucket 3c with a second link pin 3de being interposed.

A pressure sensor 6a is attached to a head side of boom cylinder 4a. Pressure sensor 6a can detect a pressure (a head pressure) of hydraulic oil within a cylinder-head-side oil chamber 40A of boom cylinder 4a. A pressure sensor 6b is attached to a bottom side of boom cylinder 4a. Pressure sensor 6b can detect a pressure (a bottom pressure) of hydraulic oil within a cylinder-bottom-side oil chamber 40B of boom cylinder 4a.

A stroke sensor 7a is attached to boom cylinder 4a. Stroke sensor 7a detects an amount of displacement of a cylinder rod 4ab with respect to a cylinder 4aa in boom cylinder 4a. A stroke sensor 7b is attached to arm cylinder 4b. Stroke sensor 7b detects an amount of displacement of a cylinder rod in arm cylinder 4b. A stroke sensor 7c is attached to bucket cylinder 4c. Stroke sensor 7c detects an amount of displacement of a cylinder rod in bucket cylinder 4c.

Angle sensor 9a is attached around boom foot pin 5a. Angle sensor 9b is attached around arm coupling pin 5b. Angle sensor 9c is attached around attachment coupling pin 5c. Angle sensors 9a, 9b, and 9c may each be implemented by a potentiometer or a rotary encoder.

As shown in FIG. 1, in a boom operation region in a side view, an angle formed between a straight line (shown with a chain double dotted line in FIG. 1) that passes through boom foot pin 5a and arm coupling pin 5b and a straight line (shown with a dashed line in FIG. 1) that extends in the upward/downward direction is defined as a boom angle θb. Boom angle θb represents an angle of boom 3a with respect to revolving unit 2. Boom angle θb can be calculated from a result of detection by stroke sensor 7a or a measurement value from angle sensor 9a.

In an arm operation region in a side view, an angle formed between the straight line (shown with the chain double dotted line in FIG. 1) that passes through boom foot pin 5a and arm coupling pin 5b and a straight line (shown with a chain double dotted line in FIG. 1) that passes through arm coupling pin 5b and attachment coupling pin 5c is defined as an arm angle θa. Arm angle θa represents an angle of arm 3b with respect to boom 3a. Arm angle θa can be calculated from a result of detection by stroke sensor 7b or a measurement value from angle sensor 9b.

In a bucket operation region in a side view, an angle formed between the straight line (shown with the chain double dotted line in FIG. 1) that passes through arm coupling pin 5b and attachment coupling pin 5c and a straight line (shown with a chain double dotted line in FIG. 1) that passes through attachment coupling pin 5c and a cutting edge of bucket 3c is defined as a bucket angle θk. Bucket angle θk represents an angle of bucket angle 3c with respect to arm 3b. Bucket angle θk can be calculated from a result of detection by stroke sensor 7c or a measurement value from angle sensor 9c.

Inertial measurement units (IMUS) 8a, 8b, 8c, and 8d are attached to revolving unit 2, boom 3a, arm 3b, and first member 3da, respectively. IMU 8a measures an acceleration of revolving unit 2 in a fore/aft direction, a lateral direction, and the upward/downward direction and an angular velocity of revolving unit 2 around the fore/aft direction, the lateral direction, and the upward/downward direction. IMUS 8b, 8c, and 8d measure accelerations of boom 3a, arm 3b, and bucket 3c in the fore/aft direction, the lateral direction, and the upward/downward direction and angular velocities of boom 3a, arm 3b, and bucket 3c around the fore/aft direction, the lateral direction, and the upward/downward direction, respectively.

Based on a difference between the acceleration measured by IMU 8a attached to revolving unit 2 and the acceleration measured by IMU 8b attached to boom 3a, an acceleration in extension and contraction of boom cylinder 4a (an amount of change in speed of extension and contraction of boom cylinder 4a) can be obtained. Boom angle θb, arm angle θa, and bucket angle θk may be measured by the IMUS.

<Schematic Configuration of System of Work Machine>

Figure 2:
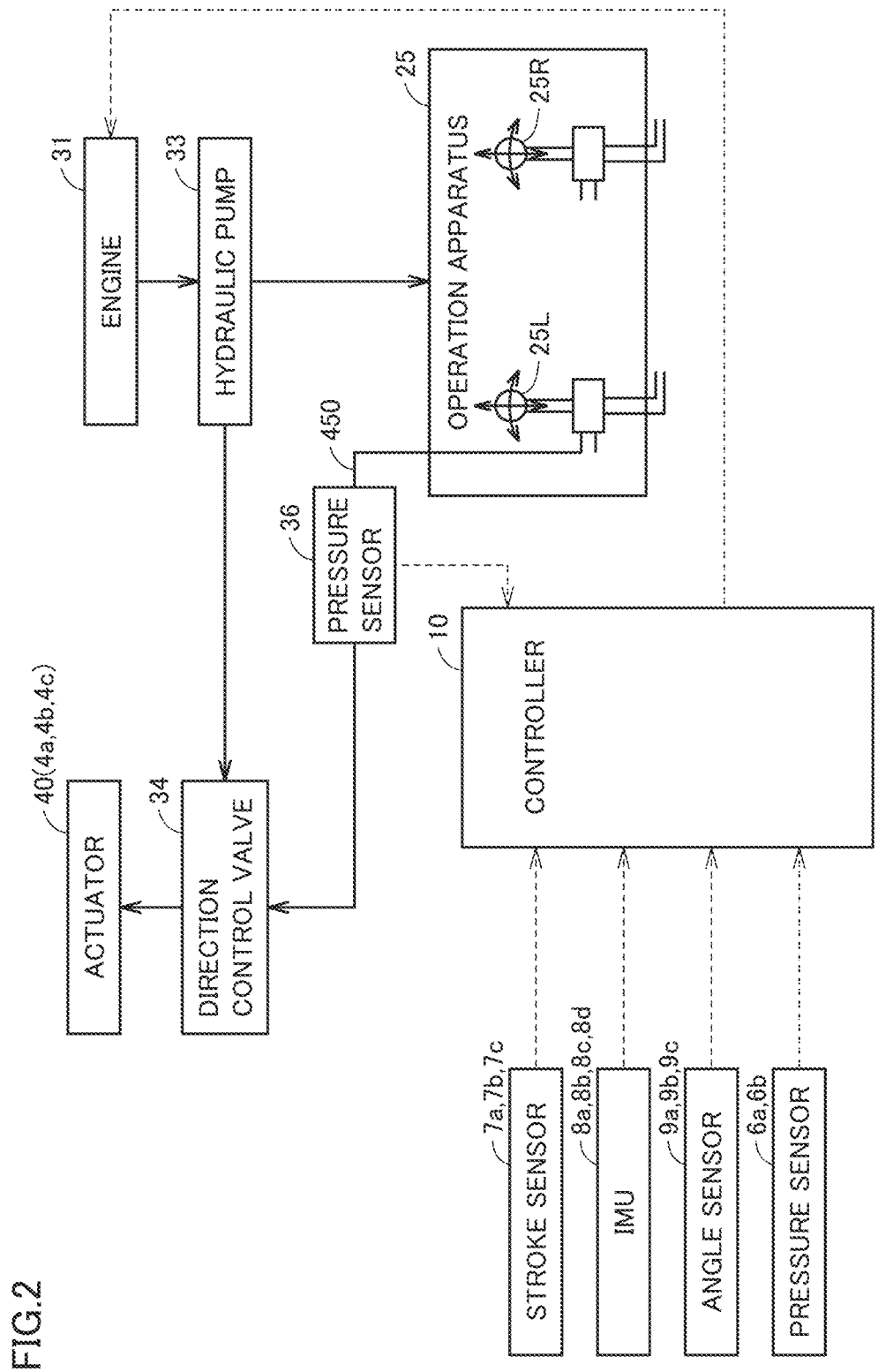
FIG. 2 is a block diagram showing a schematic configuration of a system of the work machine shown in FIG. 1.

A schematic configuration of a system of the work machine will now be described with reference to FIG. 2. FIG. 2 is a block diagram showing a schematic configuration of a system of the work machine shown in FIG. 1.

As shown in FIG. 2, the system in the present embodiment is a system for determining a payload value. The system in the present embodiment includes hydraulic excavator 100 representing an exemplary work machine shown in FIG. 1 and a controller 10 shown in FIG. 2. Controller 10 may be mounted on hydraulic excavator 100. Controller 10 may be provided outside hydraulic excavator 100. Controller 10 may be arranged at a worksite of hydraulic excavator 100 or at a remote location distant from the worksite of hydraulic excavator 100.

Engine 31 is, for example, a diesel engine. Output from engine 31 is controlled by control of an amount of injection of fuel into engine 31 by controller 10.

A hydraulic pump 33 is coupled to engine 31. As rotational drive force from engine 31 is transmitted to hydraulic pump 33, hydraulic pump 33 is driven. Hydraulic pump 33 is a variable displacement hydraulic pump that includes, for example, a swash plate and varies a delivery capacity as an angle of tilt of the swash plate is varied. Some of oil delivered from hydraulic pump 33 is supplied as hydraulic oil to a direction control valve 34. Some of oil delivered from hydraulic pump 33 is reduced in pressure by a pressure reduction valve and used as pilot oil.

Direction control valve 34 is a spool type valve that switches a direction of flow of hydraulic oil, for example, by moving a rod-shaped spool. As the spool moves in an axial direction, an amount of supply of hydraulic oil to a hydraulic actuator 40 is regulated. Direction control valve 34 is provided with a spool stroke sensor that detects a distance of movement of the spool (spool stroke).

As supply and release of a hydraulic pressure to hydraulic actuator 40 is controlled, an operation of work implement 3, revolution of revolving unit 2, and a traveling operation of traveling unit 1 are controlled. Hydraulic actuator 40 includes boom cylinder 4a, arm cylinder 4b, and bucket cylinder 4c shown in FIG. 1 and a not-shown revolution motor.

In the present example, oil supplied to hydraulic actuator 40 for activating hydraulic actuator 40 is referred to as hydraulic oil. Oil supplied to direction control valve 34 for activating direction control valve 34 is referred to as pilot oil. A pressure of pilot oil is referred to as a pilot hydraulic pressure.

Hydraulic pump 33 may deliver both of hydraulic oil and pilot oil as above. Hydraulic pump 33 may separately include a hydraulic pump (a main hydraulic pump) that delivers hydraulic oil and a hydraulic pump (pilot hydraulic pump) that delivers pilot oil.

An operation apparatus 25 is arranged in operator's cab 2a. Operation apparatus 25 is operated by an operator. Operation apparatus 25 accepts an operation by the operator for driving work implement 3. Operation apparatus 25 accepts an operation by the operator for revolving revolving unit 2. Operation apparatus 25 provides an operation signal in response to an operation by the operator. Though operation apparatus 25 is, for example, a pilot hydraulic operation apparatus in the present example, it may be an electrical operation apparatus.

Operation apparatus 25 includes a first control lever 25R and a second control lever 25L. First control lever 25R is arranged, for example, on the right of operator's seat 2b. Second control lever 25L is arranged, for example, on the left of operator's seat 2b. Operations in front, rear, left, and right directions onto first control lever 25R and second control lever 25L correspond to biaxial operations.

For example, boom 3a and bucket 3c are operated by operating first control lever 25R. An operation onto first control lever 25R in the fore/aft direction corresponds, for example, to an operation of boom 3a, and an operation to lower boom 3a and an operation to raise boom 3a are performed in accordance with the operation in the fore/aft direction. An operation onto first control lever 25R in the lateral direction corresponds, for example, to an operation of bucket 3c, and an operation in a direction of excavation (upward) and a direction of dumping (downward) of bucket 3c is performed in accordance with the operation in the lateral direction.

For example, arm 3b and revolving unit 2 are operated by operating second control lever 25L. An operation in the fore/aft direction onto second control lever 25L corresponds, for example, to revolution of revolving unit 2, and a right revolution operation and a left revolution operation of revolving unit 2 are performed in accordance with an operation in the fore/aft direction. An operation onto second control lever 25L in the lateral direction corresponds, for example, to an operation of arm 3b, and the operation of arm 3b in the direction of dumping (upward) and the direction of excavation (downward) is performed in accordance with the operation in the lateral direction.

Pilot oil delivered from hydraulic pump 33 and reduced in pressure by the pressure reduction valve is supplied to operation apparatus 25. The pilot hydraulic pressure is regulated based on an amount of operation onto operation apparatus 25.

Operation apparatus 25 and direction control valve 34 are connected to each other through a pilot oil channel 450. Pilot oil is supplied to direction control valve 34 through pilot oil channel 450. A spool of direction control valve 34 is thus moved in the axial direction to regulate a direction of flow and a flow rate of hydraulic oil supplied to boom cylinder 4a, arm cylinder 4b, and bucket cylinder 4c, so that operations in the upward/downward direction of boom 3a, arm 3b, and bucket 3c are performed.

A pressure sensor 36 is arranged in pilot oil channel 450. Pressure sensor 36 detects a pilot hydraulic pressure. A result of detection by pressure sensor 36 is provided to controller 10. An amount of increase in pilot hydraulic pressure is different depending on an angle of tilt of each of control levers 25L and 25R from a neutral position. Contents of the operation onto operation apparatus 25 can be determined based on a result of detection of the pilot hydraulic pressure by pressure sensor 36.

Detection signals from stroke sensors 7a to 7c, IMUs 8a to 8d, angle sensors 9a to 9c, and pressure sensors 6a and 6b are also provided to controller 10.

Controller 10 may electrically be connected to each of stroke sensors 7a to 7c, IMUs 8a to 8d, angle sensors 9a to 9c, and pressure sensors 6a, 6b, and 36 through wires, or may wirelessly communicate therewith. Controller 10 may be implemented, for example, by a computer, a server, or a portable terminal, or by a central processing unit (CPU).

Though operation apparatus 25 has been described above as being of a pilot hydraulic type, operation apparatus 25 may be electric. When operation apparatus 25 is electric, an amount of operation onto each of first control lever 25R and second control lever 25L is detected, for example, by a potentiometer. The potentiometer is a displacement sensor that obtains an electric (voltage) output in proportion to a mechanical position. A result of detection by the potentiometer is provided to controller 10. Contents of operation onto operation apparatus 25 can be determined based on a result of detection by the potentiometer.

<Functional Block in Controller 10>

Figure 3:
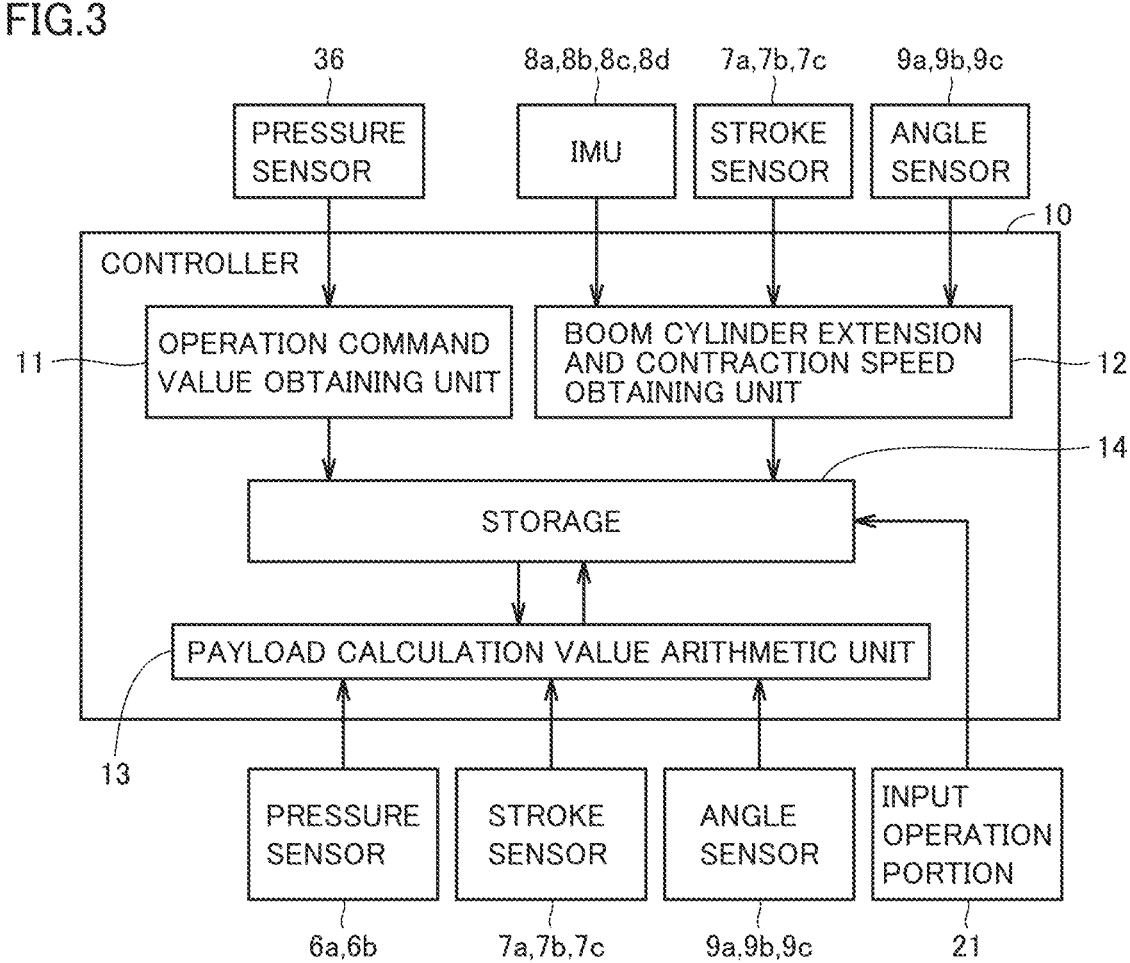
FIG. 3 is a diagram showing a functional block within a controller shown in FIG. 2.

A functional block in controller 10 will now be described with reference to FIG. 3. FIG. 3 is a diagram showing a functional block within controller 10 shown in FIG. 2.

As shown in FIG. 3, controller 10 includes an operation command value obtaining unit 11, a boom cylinder extension and contraction speed obtaining unit 12, a payload calculation value arithmetic unit 13, and a storage 14.

Operation command value obtaining unit 11 receives input of a signal indicating a pilot hydraulic pressure detected by pressure sensor 36. Operation command value obtaining unit 11 detects, for example, an operation command value for operating boom cylinder 4a from the signal indicating the pilot hydraulic pressure detected by pressure sensor 36. The operation command value obtained by operation command value obtaining unit 11 is provided to storage 14 and stored therein.

Boom cylinder extension and contraction speed obtaining unit 12 receives input of a signal indicating an acceleration or the like detected by each of IMUs 8a to 8d. Boom cylinder extension and contraction speed obtaining unit 12 detects an acceleration in extension and contraction of boom cylinder 4a (an amount of change in speed of extension and contraction of boom cylinder 4a), for example, based on a difference between the acceleration detected by IMU 8a attached to revolving unit 2 and the acceleration detected by IMU 8b attached to boom 3a.

Boom cylinder extension and contraction speed obtaining unit 12 receives input of signals indicating amounts of displacement of the cylinder rods detected by stroke sensors 7a to 7c. Boom cylinder extension and contraction speed obtaining unit 12 receives input of signals indicating angles of the work implement (boom angle θb, arm angle θa, and bucket angle θk) detected by angle sensors 9a to 9c. Boom cylinder extension and contraction speed obtaining unit 12 detects a speed of extension and contraction of boom cylinder 4a, for example, based on an amount of displacement of the cylinder rod detected by stroke sensor 7a or an angle of the work implement (boom angle θb) detected by angle sensor 9a.

The speed of extension and contraction (or the amount of change in speed of extension and contraction) of boom cylinder 4a detected by boom cylinder extension and contraction speed obtaining unit 12 is provided to storage 14 and stored therein.

Payload calculation value arithmetic unit 13 receives input of signals indicating a head pressure and a bottom pressure of boom cylinder 4a detected by pressure sensors 6a and 6b. Payload calculation value arithmetic unit 13 receives input of signals indicating amounts of displacement of the cylinder rods detected by stroke sensors 7a to 7c. Payload calculation value arithmetic unit 13 receives input of signals indicating angles of the work implement (boom angle θb, arm angle θa, and bucket angle θk) detected by angle sensors 9a to 9c.

Payload calculation value arithmetic unit 13 computes a payload calculation value from the provided signal. The payload calculation value computed by payload calculation value arithmetic unit 13 is provided to storage 14 and stored therein.

<Payload Calculation>

A current payload calculation value (CalcuPayload) within bucket 3c is computed based on balance of a moment around boom foot pin 5a in the embodiment. Payload calculation value arithmetic unit 13 shown in FIG. 3 computes a payload calculation value (CalcuPayload).

Initially, moment $MX_{we}$ caused by self-weight of work implement 3 is calculated in accordance with an expression (1) below.

[Expression 1]

$$MX_{we} = M_{boom} \times X_{boom\_c} + M_{boomC} \times X_{boomC\_c} + M_{boomCR} \times X_{boomCR\_c} + M_{arm} \times X_{arm\_c} + M_{armC} \times X_{armC\_c} + M_{armCR} \times X_{armCR\_c} + M_{bucket} \times X_{bucket\_c} \quad (1)$$

In the expression (1), $M_{boom}$ represents a weight of boom 3a. $M_{boomC}$ represents a weight of a cylinder portion of boom cylinder 4a. $M_{boomCR}$ represents a weight of a cylinder rod portion of boom cylinder 4a. $M_{arm}$ represents a weight of arm 3b. $M_{armC}$ represents a weight of a cylinder portion of arm cylinder 4b. $M_{armCR}$ represents a weight of a cylinder rod portion of arm cylinder 4b. $M_{bucket}$ represents a weight of bucket 3c.

Each of weights $M_{boom}$, $M_{boomC}$, $M_{boomCR}$, $M_{arm}$, $M_{armC}$, $M_{armCR}$, and $M_{bucket}$ is stored in storage 14, for example, by an operation for input to storage 14 onto an input operation portion 21 shown in FIG. 3.

In the expression (1), $X_{boom\_c}$ represents a horizontal distance from (a pivot central axis of) boom foot pin 5a to the center of gravity of boom 3a. $X_{boomC\_c}$ represents a horizontal distance from boom foot pin 5a to the center of gravity of the cylinder portion of boom cylinder 4a. $X_{boomCR\_c}$ represents a horizontal distance from boom foot pin 5a to the center of gravity of the cylinder rod portion of boom cylinder 4a. $X_{arm\_c}$ represents a horizontal distance from boom foot pin 5a to the center of gravity of arm 3b. $X_{armC\_c}$ represents a horizontal distance from boom foot pin 5a to the center of gravity of the cylinder portion of arm cylinder 4b. $X_{armCR\_c}$ represents a horizontal distance from boom foot pin 5a to the center of gravity of the cylinder rod portion of arm cylinder 4b. $X_{bucket\_c}$ represents a horizontal distance from boom foot pin 5a to the center of gravity of bucket 3c.

Each of these distances $X_{boom\_c}$, $X_{boomC\_c}$, $X_{boomCR\_c}$, $X_{arm\_c}$, $X_{armC\_c}$, $X_{armCR\_c}$, and $X_{bucket}$ can be calculated from results of detection by stroke sensors 7a to 7c and angle sensors 9a to 9c.

Balance of moments around boom foot pin 5a is expressed in an expression (2) below.

[Expression 2]

$$F \times h = CalcuPayload \times X_{payload\_c} + MX_{we} \quad (2)$$

In the expression (2), F represents load (pressing force) of boom cylinder 4a and it is obtained from a head pressure and a bottom pressure of boom cylinder 4a. Therefore, F is obtained from a pressure (head pressure) detected by pressure sensor 6a and a pressure (bottom pressure) detected by pressure sensor 6b.

In the expression (2), h represents a shortest distance between boom foot pin 5a and boom cylinder 4a (a distance in a direction orthogonal to a direction of extension of boom cylinder 4a) (see also FIG. 1). h can be calculated from detection values from stroke sensor 7a and angle sensor 9a. By calculating F×h, load F of boom cylinder 4a is adjusted to a load of the boom different in direction of extension.

In the expression (2), $X_{payload\_c}$ represents a distance between boom foot pin 5a and the center of gravity of a load within bucket 3c. The position of the center of gravity of the load within bucket 3c may be considered as the position of the center of gravity of full loads that can be held in bucket 3c. $X_{payload\_c}$ can be calculated from detection values from stroke sensors 7a to 7c and angle sensors 9a to 9c.

Based on the expression (2), a payload calculation value (CalcuPayload) is expressed in an expression (3) below.

[Expression 3]

$$CalcuPayload = \frac{F \times h - MX_{we}}{X_{payload\_c}} \quad (3)$$

<Estimation of Weight of Work Implement>

It is difficult to actually measure a weight and a position of the center of gravity of each link member included in work implement 3, such as boom 3a and arm 3b. The position of the center of gravity of boom 3a is used for calculating distance $X_{boom\_C}$, and the position of the center of gravity of arm 3b is used for calculating distance $X_{arm\_c}$.

As set forth above, weight $M_{boom}$ of boom 3a, weight $M_{arm}$ of arm 3b, distance $X_{boom\_c}$, and distance $X_{arm\_c}$ are used for computation of the payload calculation value.

As set forth above, the payload calculation value is found by calculation based on balance of the moment. The moment of a constituent member of the work implement is expressed as a product of the weight (to be exact, a mass) of the constituent member and the distance from the central axis of rotation to the position of the center of gravity. Therefore, when weight $M_{boom}$ and the position of the center of gravity of boom 3a and weight $M_{arm}$ and the position of the center of gravity of arm 3b to be used for computation of the payload calculation value deviate from true values, the moment around boom foot pin 5a is not correctly calculated, and a computed value of the payload calculation value is different depending on the attitude of work implement 3. In order to enhance accuracy of the payload calculation value, accurate estimation of the moments of boom 3a and arm 3b is required also when designed values of the weight and the position of the center of gravity of boom 3a and arm 3b are unknown.

Figure 4:
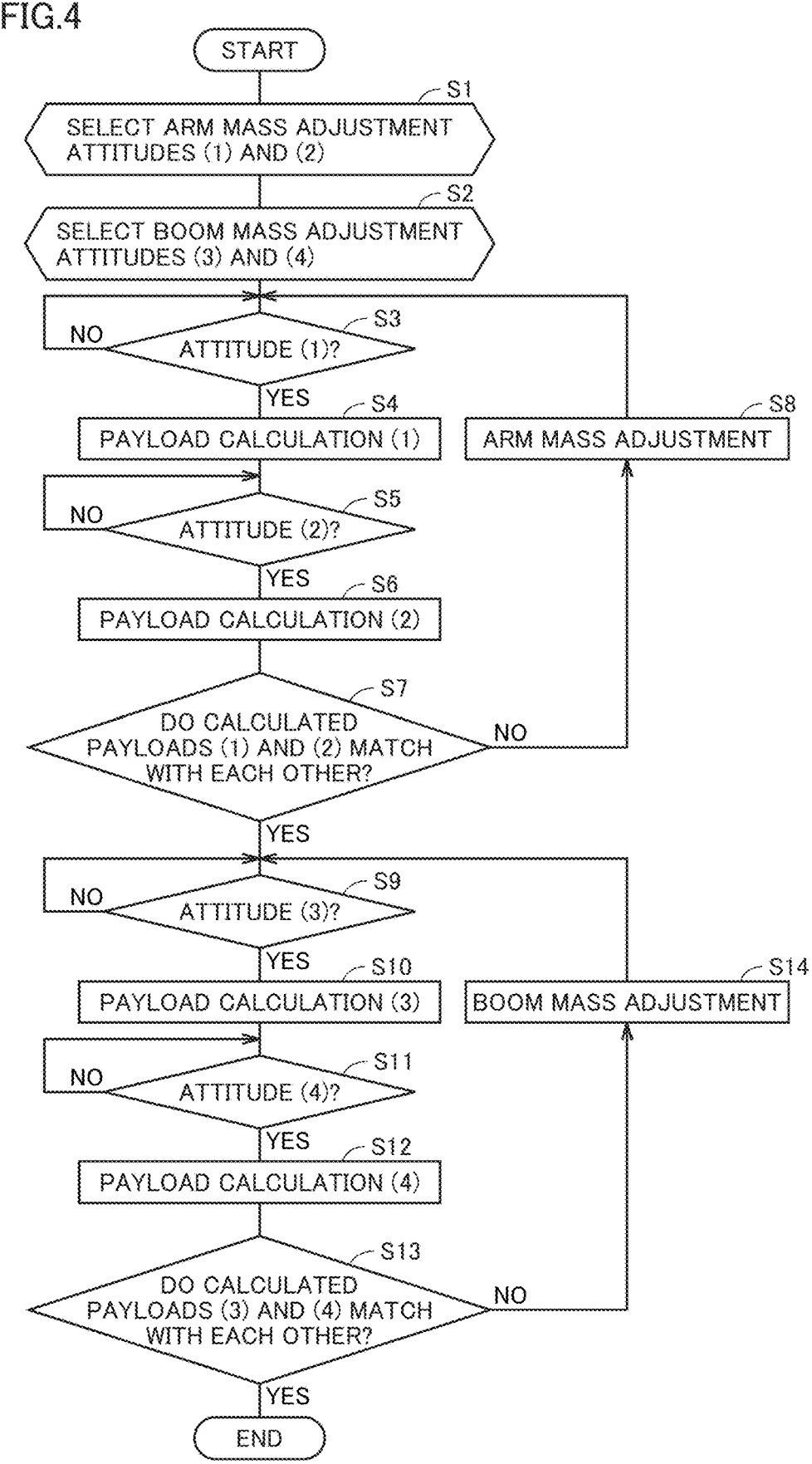
FIG. 4 is a flowchart showing a method of adjusting a weight of a work implement based on the embodiment.

According to the method in the present disclosure, the moment of the constituent member can be obtained more accurately than in a conventional example, by obtaining the payload calculation value in a plurality of attitudes of the work implement with the position of the center of gravity of the constituent member being provisionally set and adjusting the weight of the constituent member such that the obtained payload calculation values in the plurality of attitudes of the work implement are equal to each other. FIG. 4 is a flowchart showing a method of adjusting a weight of work implement 3 based on the embodiment. The method of adjusting the weight of work implement 3 based on the embodiment will be described below with reference to FIGS. 4 and 5 to 6 as appropriate.

Initially, in step S1, a first attitude (which is referred to as an attitude (1) below) for adjusting the mass of arm 3b and a second attitude (which is referred to as an attitude (2) below) for adjusting the mass of arm 3b are selected as will be described later.

Figure 5:
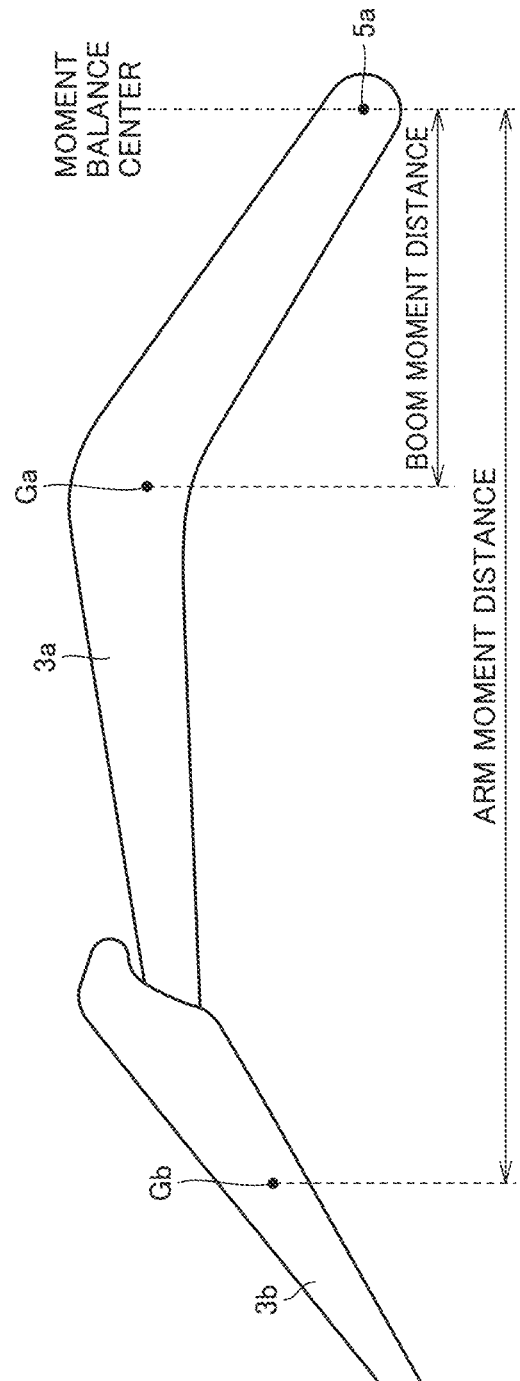
FIG. 5 is a diagram schematically showing a boom gravity-center position and an arm gravity-center position.

FIG. 5 is a diagram schematically showing a boom gravity-center position Ga and an arm gravity-center position Gb. Boom gravity-center position Ga shown in FIG. 5 represents a position of the center of gravity of boom 3a. Arm gravity-center position Gb shown in FIG. 5 represents the position of the center of gravity of arm 3b. A "boom moment distance" shown in FIG. 5 represents a horizontal distance from a moment balance center (boom foot pin 5a) to boom gravity-center position Ga, that is, distance $X_{boom\_c}$ described above. An "arm moment distance" shown in FIG. 5 represents a horizontal distance from the moment balance center (boom foot pin 5a) to arm gravity-center position Gb, that is distance $X_{arm\_c}$ described above.

Figure 6:
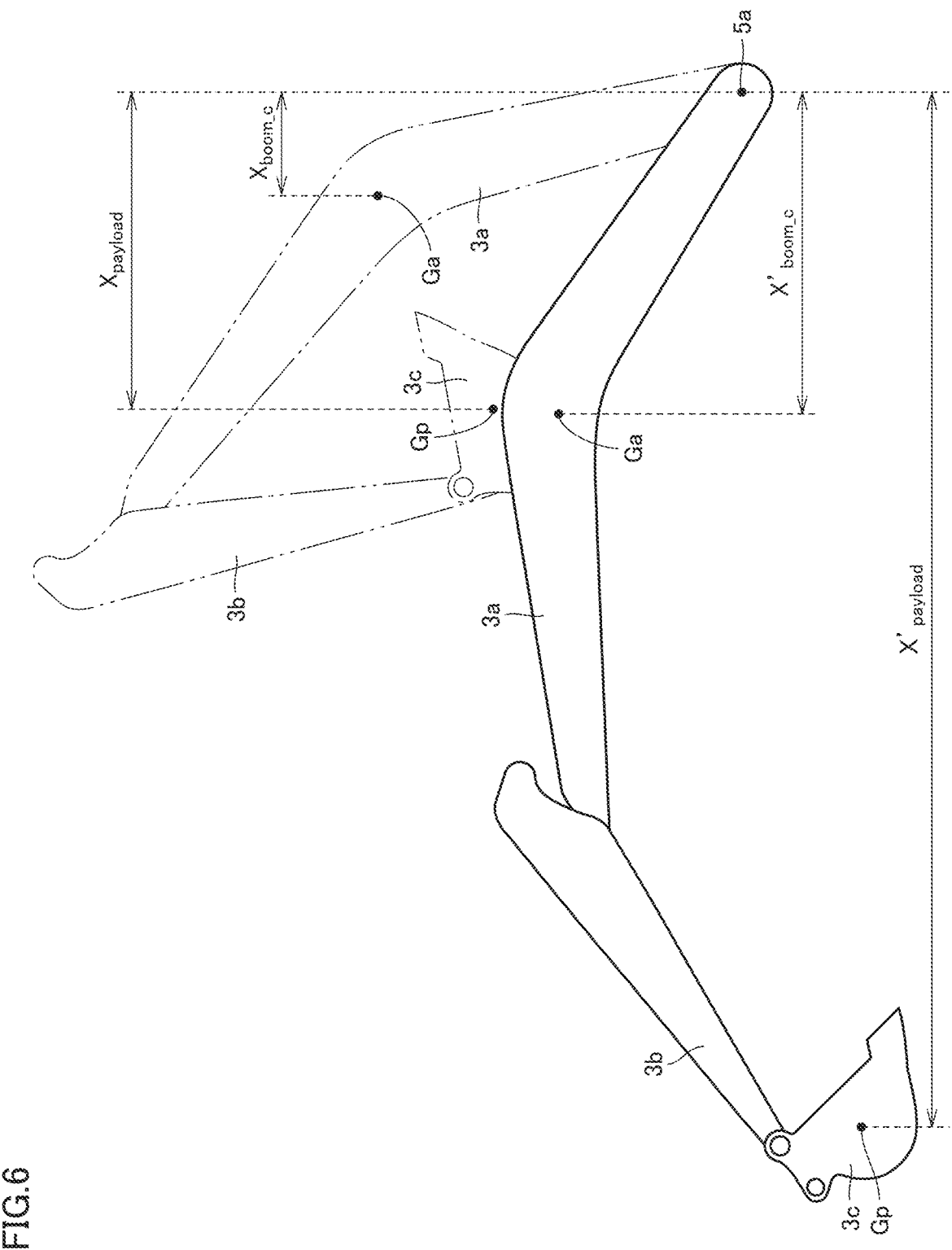
FIG. 6 is a diagram schematically showing an attitude for adjusting a mass of the arm.

FIG. 6 is a diagram schematically showing an attitude for adjusting a mass of arm 3b. A distance $X_{payload}$ shown in FIG. 6 represents a horizontal distance from a gravity-center position Gp of loads loaded on work implement 3 (bucket 3c) to the moment balance center (boom foot pin 5a).

Deviation of the mass of boom 3a from the true value is defined as $\Delta M_{boom}$. Then, the moment around boom foot pin 5a corresponding to this deviation in mass can be found as a product of mass deviation $\Delta M_{boom}$ and moment distance $X_{boom\_c}$ of boom 3a described above.

An error is produced in the payload calculation value due to deviation of the mass of boom 3a. The moment around boom foot pin 5a due to this error of the payload calculation value is found as a product of a payload calculation value error $\Delta$CalcuPayload and distance $X_{payload}$.

Since the moment around boom foot pin 5a produced by deviation of the mass of boom 3a must be in balance, an expression (4) below is satisfied.

[Expression 4]

$$\Delta M_{boom} \times X_{boom\_c} = \Delta\text{CalcuPayload} \times X_{payload} \quad (4)$$

By transforming the expression (4), an expression (5) is obtained.

[Expression 5]

$$\Delta\text{CalcuPayload} = \frac{\Delta M_{boom} \times X_{boom\_c}}{X_{payload}} \quad (5)$$

As seen in the expression (5), payload calculation value error $\Delta$CalcuPayload is varied depending on a ratio between distance $X_{boom\_c}$ and distance $X_{payload}$. When the payload calculation values are compared with each other in two attitudes equal in value of ($X_{boom\_c}/X_{payload}$), payload calculation value errors $\Delta$CalcuPayload due to deviation of the mass of boom 3a are equal, and hence influence by deviation of the mass of boom 3a on the payload calculation value can be eliminated. When the payload calculation values are computed in those two attitudes in an unloaded state, different payload calculation values are calculated in the two attitudes, and that error is caused only by deviation of the mass of arm 3b. Therefore, two attitudes in which the ratio between distance $X_{boom\_c}$ and distance $X_{payload}$ and a ratio between a distance $X'_{boom\_c}$ and a distance $X'_{payload}$ are equal to each other shown in FIG. 6 are selected, and these two attitudes are defined as attitude (1) and attitude (2), respectively.

Then, in step S2, a third attitude (which is referred to as an attitude (3) below) for adjusting the mass of boom 3a and a fourth attitude (which is referred to as an attitude (4) below) for adjusting the mass of boom 3a are selected as will be described later.

As in selection of attitude (1) and attitude (2) described above, two attitudes in which influence by deviation of the mass of arm 3b on the payload calculation value can be eliminated are selected. Specifically, two attitudes equal in ratio between distance $X_{arm\_c}$ and distance $X_{payload}$ are selected and these two attitudes are defined as attitude (3) and attitude (4), respectively.

Work implement 3 is operated to set the attitude thereof to attitude (1). In step S3, whether or not work implement 3 is in attitude (1) is determined. When work implement 3 is determined as not being in attitude (1) (NO in step S3), determination in step S3 is repeated. Determination in step S3 is repeated until work implement 3 is in attitude (1).

When work implement 3 is determined as being in attitude (1) (YES in step S3), the process proceeds to step S4 and the payload calculation value in attitude (1) is computed. When there is no information on designed values of boom gravity-center position Ga and arm gravity-center position Gb at the time of computation of the payload calculation value, the payload calculation value can be computed in accordance with the expression (3), with already known designed values of boom gravity-center position Ga and arm gravity-center position Gb for a work machine of the same size being provisionally set as boom gravity-center position Ga and arm gravity-center position Gb.

Work implement 3 is operated to set the attitude thereof to attitude (2). In step S5, whether or not work implement 3 is in attitude (2) is determined. When work implement 3 is determined as not being in attitude (2) (NO in step S5), determination in step S5 is repeated. Determination in step S5 is repeated until work implement 3 is in attitude (2).

When work implement 3 is determined as being in attitude (2) (YES in step S5), the process proceeds to step S6 and the payload calculation value in attitude (2) is computed.

In step S7, the payload calculation value in attitude (1) computed in step S4 is compared with the payload calculation value in attitude (2) computed in step S6.

When the payload calculation value computed in attitude (1) is determined as being different from the payload calculation value computed in attitude (2) as a result of comparison between the payload calculation values in step S7 (NO in step S7), the process proceeds to step S8 and the weight of arm 3b is adjusted. Specifically, deviation of the mass of arm 3b is calculated by inverse operation from the payload calculation values different between attitude (1) and attitude (2). The mass of arm 3b to be used for the payload calculation value is changed to lessen deviation of this mass. Thereafter, the process returns to determination in step S3 and processing in step S3 to step S7 is repeated.

When the payload calculation value computed in attitude (1) is determined as being equal to the payload calculation value computed in attitude (2) as a result of comparison between the payload calculation values in step S7, the mass of arm 3b at that time is defined as the mass for moment calculation of arm 3b. The mass of arm 3b is outputted to storage 14 and stored therein.

In succession, work implement 3 is operated to set the attitude thereof to attitude (3). In step S9, whether or not work implement 3 is in attitude (3) is determined. When work implement 3 is determined as not being in attitude (3) (NO in step S9), determination in step S9 is repeated. Determination in step S9 is repeated until work implement 3 is in attitude (3).

When work implement 3 is determined as being in attitude (3) (YES in step S9), the process proceeds to step S10 and the payload calculation value in attitude (3) is computed.

Work implement 3 is operated to set the attitude thereof to attitude (4). In step S11, whether or not work implement 3 is in attitude (4) is determined. When work implement 3 is determined as not being in attitude (4) (NO in step S11), determination in step S11 is repeated. Determination in step S11 is repeated until work implement 3 is in attitude (4).

When work implement 3 is determined as being in attitude (4) (YES in step S11), the process proceeds to step S12 and the payload calculation value in attitude (4) is computed.

In step S13, the payload calculation value in attitude (3) computed in step S10 is compared with the payload calculation value in attitude (4) computed in step S12.

When the payload calculation value computed in attitude (3) is determined as being different from the payload calculation value computed in attitude (4) as a result of comparison between the payload calculation values in step S13 (NO in step S13), the process proceeds to step S14 and the weight of boom 3a is adjusted. Specifically, deviation of the mass of boom 3a is calculated by inverse operation from the payload calculation values different between attitude (3) and attitude (4). The mass of boom 3a to be used for the payload calculation value is changed to lessen deviation of this mass. Thereafter, the process returns to determination in step S9 and processing in step S9 to step S13 is repeated.

When the payload calculation value computed in attitude (3) is determined as being equal to the payload calculation value computed in attitude (4) as a result of comparison between the payload calculation values in step S13, the mass of boom 3a at that time is defined as the mass for moment calculation of boom 3a. The mass of boom 3a is outputted to storage 14 and stored therein.

Then, the process ends (end in FIG. 4).

<Functions and Effects>

Characteristic features and functions and effects of the present embodiment are summarized as below, although description thereof may overlap with the description above.

In the method of estimating a moment of the work implement according to the embodiment, as shown in FIG. 4, in step S1, two attitudes equal to each other in ratio between distance $X_{boom\_c}$ and distance $X_{payload}$ are selected as attitude (1) and attitude (2). In step S3, work implement 3 is set to attitude (1). In step S4, the first payload computation value which represents a weight of loads loaded on work implement 3 in attitude (1) is obtained. In step S5, work implement 3 is set to attitude (2). In step S6, a second payload computation value which represents a weight of loads loaded on work implement 3 in attitude (2) is obtained. In step S7, the first payload computation value and the second payload computation value are compared with each other. When the first payload computation value and the second payload computation value are determined as being different from each other as a result of comparison in step S7, in step S8, the mass of arm 3b to be used in payload computation is changed. Then, processing from step S3 to step S7 is repeated.

By computing payload calculation values in a plurality of attitudes not affected by deviation of the mass of boom 3a and adjusting the mass of arm 3b until there is no payload calculation value error for each attitude, the moment of arm 3b can more accurately be estimated. Since the payload calculation value can be computed with the use of the accurate moment of arm 3b even for a work machine design information of the mass of arm 3b of which is not available, an accurate value of a load weight can be calculated.

When the first payload computation value and the second payload computation value are determined as being equal to each other as a result of comparison in step S7, the mass of arm 3b at that time is defined as the mass for moment calculation of arm 3b. The moment of arm 3b can thus accurately be estimated.

As shown in FIG. 4, in step S2, two attitudes equal to each other in ratio between distance $X_{arm\_c}$ and distance $X_{payload}$ are selected as attitude (3) and attitude (4). In step S9, work implement 3 is set to attitude (3). In step S10, the third payload computation value which represents a weight of loads loaded on work implement 3 in attitude (3) is obtained. In step S11, work implement 3 is set to attitude (4). In step S12, a fourth payload computation value which represents a weight of loads loaded on work implement 3 in attitude (4) is obtained. In step S13, the third payload computation value and the fourth payload computation value are compared with each other. When the third payload computation value and the fourth payload computation value are determined as being different from each other as a result of comparison in step S13, in step S14, the mass of boom 3a to be used in payload computation is changed. Then, processing from step S3 to step S7 is repeated.

By computing the payload calculation values in a plurality of attitudes not affected by deviation of the mass of arm 3b and adjusting the mass of boom 3a until there is no payload calculation value error for each attitude, the moment of boom 3a can more accurately be estimated. Since the payload calculation value can be computed with the use of the accurate moment of boom 3a even for a work machine design information of the mass of boom 3a of which is not available, an accurate value of a load weight can be calculated.

When the third payload computation value and the fourth payload computation value are determined as being equal to each other as a result of comparison in step S13, the mass of boom 3a at that time is defined as the mass for moment calculation of boom 3a. The moment of boom 3a can thus accurately be estimated.

As shown in FIG. 4, after a series of processing from step S3 to step S7, a series of processing from step S9 to step S13 is performed.

By sequentially making adjustment such as adjustment of the mass of arm 3b in two attitudes identical in influence by deviation of the mass of boom 3a on the moment and following adjustment of the mass of boom 3a in two attitudes identical in influence by deviation of the mass of arm 3b on the moment, the masses of both of arm 3b and boom 3a can properly be adjusted.

Though the mass of arm 3b is adjusted and thereafter the mass of boom 3a is adjusted in the description of the embodiment above, the order of adjustment of the mass is not limited as such. The mass of boom 3a may be adjusted in an attitude not affected by deviation of the mass of arm 3b and thereafter the mass of arm 3b may be adjusted in an attitude not affected by deviation of the mass of boom 3a.

When a designed value of bucket 3c is unknown in addition to boom 3a and arm 3b, in an attitude not affected by deviation of the masses of any two of boom 3a, arm 3b, and bucket 3c, the mass of one remaining component can be adjusted. In this case as well, the masses of boom 3a, arm 3b, and bucket 3c may be adjusted in any order among six orders.

VERIFICATION EXAMPLE

A verification example will be described below. For a hydraulic excavator a weight and a position of the center of gravity of the boom and the arm of which were unknown, a payload calculation value was computed in a plurality of attitudes with the attitude of the work implement being changed before adjustment of the masses of the boom and the arm. After adjustment of the masses of the boom and the arm with the method in the embodiment, the attitude of the work implement was changed and a payload computation value was computed in the same plurality of attitudes. The payload calculation values before and after adjustment were compared with each other.

Figure 7:
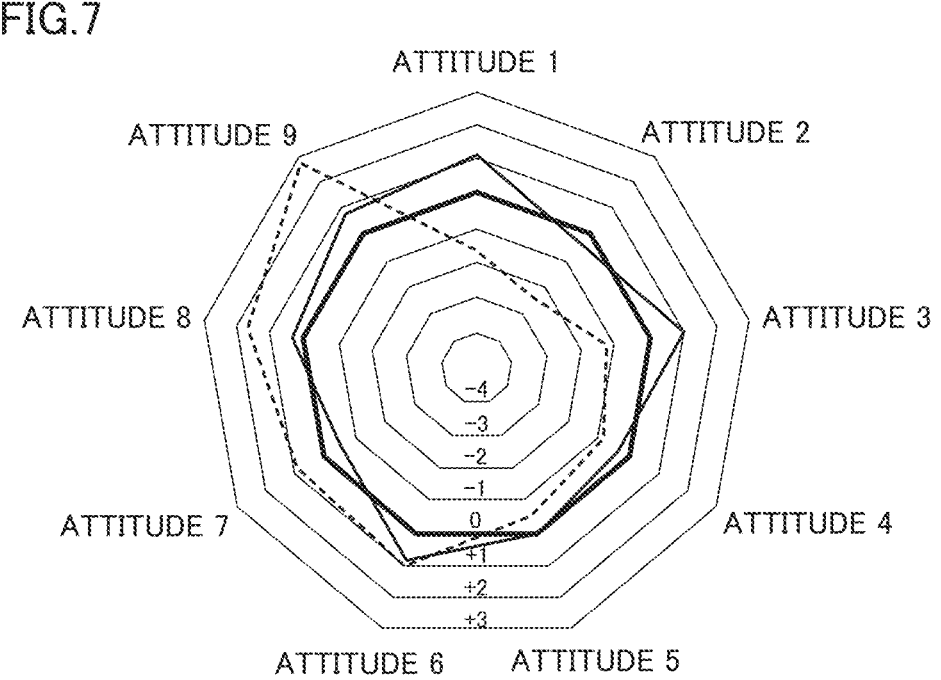
FIG. 7 is a chart showing comparison of accuracy of a payload computation value between before and after adjustment of the weight of the work implement.

FIG. 7 is a chart showing comparison of accuracy of a payload calculation value between before and after adjustment of the weight of the work implement. The payload calculation values were computed in nine attitudes in total, with boom 3a being set to three attitudes in which boom angle θb was set to 30°, 50°, and 70° and with arm angle θa being set to 40°, 95°, and 150° in boom 3a in each of the three attitudes. A bold line along a regular nonagon shown in FIG. 7 represents an actual payload value. Thin lines along a plurality of regular nonagons shown in FIG. 7 represent magnitude of deviation from the actual payload value. Numeric values from +3 to −4 annexed to the regular nonagons each represent an indicator of a direction and magnitude of deviation from the actual payload value of the payload computation value. A vertex of the regular nonagon represents one of the nine attitudes described above.

A chart shown with a dashed line in FIG. 7 represents the payload computation value in each attitude before adjustment of the weight of the work implement. A chart shown with a solid line in FIG. 7 represents the payload computation value in each attitude after adjustment of the weight of the work implement.

As shown in FIG. 7, the payload calculation value error for each attitude is larger before adjustment of the weight of the work implement and smaller after adjustment of the weight of the work implement. It was shown that accuracy in computation of the payload calculation value could be improved by more accurately estimating the moments of the boom and the arm by adjusting the weights of the boom and the arm even for a work machine a designed value of a work implement of which was unknown.

Though the embodiment and the example have been described as above, it should be understood that the embodiment and the example disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 traveling unit; 1a crawler belt apparatus; 2 revolving unit; 2a operator's cab; 2b operator's seat; 3 work implement; 3a boom (first link member); 3b arm (second link member); 3c bucket; 4a boom cylinder; 4aa cylinder; 4ab cylinder rod; 4b arm cylinder; 4c bucket cylinder; 5a boom foot pin (pivot fulcrum shaft); 5b arm coupling pin; 5c attachment coupling pin; 6a, 6b, 36 pressure sensor; 7a, 7b, 7c stroke sensor; 9a, 9b, 9c angle sensor; 10 controller; 11 operation command value obtaining unit; 12 boom cylinder extension and contraction speed obtaining unit; 13 payload calculation value arithmetic unit; 14 storage; 21 input operation portion; 25 operation apparatus; 25L second control lever; 25R first control lever; 100 hydraulic excavator (work machine)

The invention claimed is:

1. A system of estimating a moment of a work implement in a work machine with a pivot fulcrum shaft being defined as a balance center, the system comprising:

a work machine including a vehicular body and a work implement, the work implement being movable relatively to the vehicular body, the work implement including a first link member supported on the vehicular body by a pivot fulcrum shaft and a second link member attached to a tip end of the first link member; and a controller that executes instructions, the instructions, when executed by the controller, perform a method comprising:

a first step of setting the work implement to a first attitude;

a second step of obtaining a first payload computation value which represents a weight of loads loaded on the work implement in the first attitude;

a third step of setting the work implement to a second attitude, the second attitude being equal to the first attitude in ratio between a horizontal distance from a position of a center of gravity of the first link member to a base end of the first link member and the horizontal distance from a position of a center of gravity of the loads loaded on the work implement to the base end;

a fourth step of obtaining a second payload computation value which represents a weight of the loads loaded on the work implement in the second attitude;

a fifth step of comparing the first payload computation value and the second payload computation value with each other; and repeating processing from the first step to the fifth step with a weight of the second link member being changed when the first payload computation value and the second payload computation value are determined as being different from each other as a result of comparison between the first payload computation value and the second payload computation value, wherein the first payload computation value and the second payload computation value used for estimating the moment, the moment of the work implement in the work machine used to calculate a load weight with improved accuracy.

2. The system according to claim 1, wherein the weight of the second link member at time when the first payload computation value and the second payload computation value are determined as being equal to each other as a result of comparison between the first payload computation value and the second payload computation value is defined as the weight of the second link member for estimating the moment.

3. The system according to claim 1, wherein the controller executes instructions further comprising:

a sixth step of setting the work implement to a third attitude;

a seventh step of obtaining a third payload computation value which represents a weight of loads loaded on the work implement in the third attitude;

an eighth step of setting the work implement to a fourth attitude, the fourth attitude being equal to the third attitude in ratio between the horizontal distance from a position of a center of gravity of the second link member to the base end and the horizontal distance from a position of a center of gravity of the loads loaded on the work implement to the base end;

a ninth step of obtaining a fourth payload computation value which represents a weight of the loads loaded on the work implement in the fourth attitude;

a tenth step of comparing the third payload computation value and the fourth payload computation value with each other; and repeating processing from the sixth step to the tenth step with a weight of the first link member being changed when the third payload computation value and the fourth payload computation value are determined as being different from each other as a result of comparison between the third payload computation value and the fourth payload computation value.

4. The system according to claim 3, wherein the weight of the first link member at time when the third payload computation value and the fourth payload computation value are determined as being equal to each other as a result of comparison between the third payload computation value and the fourth payload computation value is defined as the weight of the first link member for estimating the moment.

5. The system according to claim 3, wherein a series of processing from the sixth step to the tenth step is performed after a series of processing from the first step to the fifth step.

6. A system of estimating a moment of a work implement in a work machine, the system comprising:

a work machine including a vehicular body and a work implement, the work implement including a first link member being movable relative to the vehicular body and a second link member being movable relative to the first link member; and a controller that executes instructions, the instructions, when executed by the controller, perform a method comprising:

obtaining a payload computation value which represents a weight of loads loaded on the work implement in a plurality of attitudes being equal to each other in ratio between a horizontal distance from a balance center in estimating the moment to a position of a center of gravity of the first link member and a horizontal distance from the balance center to a position of a center of gravity of the loads loaded on the work implement;

comparing a plurality of the payload computation values obtained in the plurality of attitudes; and determining a weight of the second link member at time when the plurality of the payload computation values are equal to each other being defined as the weight of the second link member for estimating the moment, wherein the plurality of the payload computation values used for estimating the moment, the moment of the work implement in the work machine used to calculate a load weight with improved accuracy.

7. The system according to claim 6, wherein obtaining the payload computation value comprises:

setting the work implement to a first attitude;

obtaining a first payload computation value which represents the weight of loads loaded on the work implement in the first attitude;

setting the work implement to a second attitude, the second attitude being equal to the first attitude in ratio between the horizontal distance from the position of the center of gravity of the first link member to the balance center and the horizontal distance from the position of the center of gravity of the loads loaded on the work implement to the balance center; and obtaining a second payload computation value which represents the weight of loads loaded on the work implement in the second attitude.

8. The system according to claim 6, wherein obtaining the payload computation value and comparing the plurality of the payload computation values are repeated with the weight of the second link member being changed when the plurality of the payload computation values are determined as being different from each other as a result of comparison of the plurality of payload computation values.

9. The system according to claim 6, wherein the work implement includes a third link member being movable relative to the second link member.

10. A system of estimating a moment of a work implement in a work machine, a work machine including a vehicular body and a work implement, the work implement including a first link member being movable relative to the vehicular body and a second link member being movable relative to the first link member; and a controller that executes instructions, the instructions, when executed by the controller, perform a method comprising:

obtaining a payload computation value which represents a weight of loads loaded on the work implement in a plurality of attitudes being equal to each other in ratio between a horizontal distance from a balance center in estimating the moment to a position of a center of gravity of the second link member and a horizontal distance from the balance center to a position of a center of gravity of the loads loaded on the work implement;

comparing a plurality of the payload computation values obtained in the plurality of attitudes; and determining a weight of the first link member at time when the plurality of the payload computation values are equal to each other being defined as the weight of the first link member for estimating the moment, wherein the plurality of payload computation values used for estimating the moment, the moment of the work implement in the work machine used to calculate a load weight with improved accuracy.

11. The system according to claim 10, wherein obtaining the payload computation value comprises:

setting the work implement to a third attitude;

obtaining a third payload computation value which represents the weight of loads loaded on the work implement in the third attitude;

setting the work implement to a fourth attitude, the fourth attitude being equal to the third attitude in ratio between the horizontal distance from the position of the center of the gravity of the second link member to the balance center and the horizontal distance from the position of the center of gravity of the loads loaded on the work implement to the balance center; and obtaining a fourth payload computation value which represents the weight of loads loaded on the work implement in the fourth attitude.

12. The system according to claim 10, wherein obtaining the payload computation value and comparing the plurality of the payload computation values are repeated with the weight of the first link member being changed when the plurality of the payload computation value are determined as being different from each other as a result of comparison of the plurality of payload computation values.

13. The system according to claim 10, wherein the work implement includes a third link member being movable relative to the second link member.

\* \* \* \* \*